Patented Mar. 31, 1942

2,278,375

UNITED STATES PATENT OFFICE 2,278,375

CONDENSATION PRODUCTS OF ALDEHYDES AND UREA DERIVATIVES

John Frank Olin, Grosse Ile, Mich., assignor to Sharples Chemicals Inc., a corporation of Delaware No Drawing. Application September 7, 1940, Serial No. 355,811

2 Claims. (Cl. 260—69)

The present invention pertains to chemical products formed by condensing alkyl urea derivatives with methylene-containing bodies, such as formaldehyde. This application is a continuation in part of my prior applications, Serial #164,525, filed September 18, 1937, and Serial #316,315, filed January 30, 1940, both for Manufacture of resins.

It is a well-known fact that urea may be reacted with formaldehyde to produce resinous condensation products. This reaction may be greatly accelerated by the use of small amounts of acids as catalysts, and it may also be accelerated with the aid of alkaline catalysts. The condensation reaction ordinarily occurs in two steps. In the first step, the urea reacts with formaldehyde to produce an initial reaction mixture which is liquid, and which contains dimethylol urea. When the dimethylol urea-containing reaction product is heated further to remove water and excess formaldehyde, polymerization takes place to form a hard, solid, resin.

The present invention pertains to a condensation reaction and products thereof by which urea derivatives are condensed with formaldehyde to produce substances which are not hard, or solid, resins, but which are nonetheless useful in various technical applications, for example as adhesives or as plasticizers.

The invention rests upon the discovery that, when a primary or secondary alkyl urea containing four or more substituent alkyl carbon atoms is condensed with formaldehyde or its equivalent, and the resulting condensation product is then subjected to further condensation by the application of heat, a viscous liquid or semi-solid product is obtained which can be used for one of the purposes discussed above. If the liquid obtained by condensing the particular primary or secondary alkyl urea with formaldehyde is too fluid to render it suitable for use as an adhesive or plasticizer, the viscosity of the product may be increased by incorporating unsubstituted urea, or a lower alkyl substituted urea in the initial condensation mixture, or in the condensation mixture at an intermediate stage of the condensation reaction. Care should be taken, however, to avoid the presence in the reaction mixture of a proportion of urea sufficiently large to produce a hard, or solid reaction product under the reaction conditions employed.

The following examples will assist those skilled in the art in the practice of the invention:

Example 1

80 parts of unsymmetrical dibutyl urea were mixed with 20 parts of urea, 100 parts of aqueous formaldehyde and 3 parts of 93% acetic acid. These materials were dissolved in methyl alcohol, stirred and heated until the temperature reached 150° C. The resulting product was a clear, viscous, semi-solid and possessed excellent adhesive properties for glass, paper and Cellophane. This product was soluble in aromatic hydrocarbons and alcohols. It was compatible with cellulose nitrate, cellulose acetate, cellulose acetate butyrate, vinylite, ethyl cellulose, tornesit, methyl methacrylate and alkyl phenol resins.

Example 2

30 parts of urea were mixed with 166 parts of aqueous formaldehyde, 17 parts of unsymmetrical dibutyl urea and 3 parts of 93% acetic acid. These ingredients were dissolved in 100 parts of methyl alcohol and stirred and heated until the temperature reached 135° C. The resulting product was a very viscous liquid and possessed properties similar to those of the product of Example 1.

Example 3

280 parts of butyl urea were mixed with 120 parts of urea, 810 parts of aqueous formaldehyde and 30 parts of 93% acetic acid. These ingredients were dissolved in butyl alcohol and heated until the product was found to be soluble in aromatic hydrocarbons (150° C.). The resulting condensation product was a water-white, tacky, mass. It was soluble both in aromatic hydrocarbons and in alcohols. It adhered readily to smooth surfaces such as glass or Cellophane. This type of resin may be applied as an adhesive either in the original state or in the form of a solution in an organic solvent.

Example 4

22 parts of secondary amyl urea, 3 parts of urea and 1 part of 93% acetic acid were dissolved in 50 parts of methyl alcohol and heated until the temperature reached 89° C. The mixture was then cooled and 16 parts of aqueous formaldehyde were added. Stirring and heating were then resumed until the temperature reached 160° C. The resulting condensation product was a viscous semi-solid material that softened readily upon the application of mild heat. It was soluble in alcohols and aromatic hydrocarbons and possessed excellent adhesive properties.

Example 5

25 parts of tertiary amyl urea, 25 parts of aqueous formaldehyde and 1 part of acetic acid were dissolved in 50 parts of methyl alcohol. Unmodified urea, in the amount of 6% by weight based on the tertiary amyl urea used, was added to the mixture. The mixture was stirred and heated until the temperature reached 150° C. The product was characterized by being water-white and soluble in alcohols and aromatic hydrocarbons and remained viscous and tacky at room temperatures, although possessing hardness due to the presence of the unmodified urea in the reaction mixture. It formed a tough, flexible bond when warmed and applied as an adhesive.

Example 6

Initial condensation products were prepared from dodecyl urea and formaldehyde, using the technique and relative proportions of Example 5, and, after adding a small amount of urea, further condensation was permitted to occur. The resulting product was viscous and tacky at room temperatures and possessed qualities of hardness due to the presence of urea in the condensation reaction mixture.

Example 7

57 parts of aqueous formaldehyde solution (37%) and 3 parts of acetic acid (93%) were heated together until the temperature reached 99° C., and 17 parts of dodecyl urea were thereafter added to the mixture slowly, with continued stirring of the mixture. The mixture was heated gently during the addition of the dodecyl urea in order to maintain it at 110° C., but very little heat was required, in view of the exothermic nature of the reaction. After the addition of the dodecyl urea was completed, 2 parts of anhydrous urea were then added and heating was continued until the temperature reached 125° C.

The product was characterized by stability, light color, thermoplasticity and solubility in a wide variety of organic solvents such as aromatic hydrocarbons and alcohols. Films formed from the product and baked at 250° F. for one hour were very thermoplastic and slightly tacky. The product possessed qualities of hardness due to the presence of urea in the condensation reaction mixture.

In addition to the value of the compounds of the present invention because of their properties when used alone as adhesives, these condensation products are useful as ingredients of adhesives formed by compounding them with other products. Thus, the condensation products of the present invention are compatible with nitrocellulose, castor oil, ethylcellulose, a number of alkyd resins, and various other substances useful in adhesives and plastics, as indicated in Example 1. In view of this compatibility, the condensation products of the present invention may be used as ingredients of adhesives containing these other substances, or as plasticizers for compositions incorporating such substances.

While the above discussion has not been applied specifically to thio-urea, I should like to point out that thio-urea derivatives containing primary and secondary alkyl substituents function very similarly to the corresponding derivatives of simple urea, in the practice of the present invention.

Still further modifications will be obvious to those skilled in the art, and I do not therefore wish to be limited except by the scope of the following claims.

I claim:

1. A process for producing condensation products that comprises condensing with formaldehyde a mixture of: (1) an alkyl urea containing 4 to 12 alkyl substituent carbon atoms of which at least four carbon atoms are in one alkyl radical, and (2) urea, the higher alkyl urea (1) being present in the condensation reaction in a sufficiently high proportion to prevent the formation of a solid resin upon the application of heat, and urea being present in the condensation reaction in a sufficient amount to increase substantially the viscosity of the resulting liquid condensation product.

2. A viscous liquid condensation product formed by the process described in claim 1.

JOHN FRANK OLIN.